US006869375B2

(12) United States Patent
Welsh (10) Patent No.: US 6,869,375 B2
(45) Date of Patent: Mar. 22, 2005

(54) HIGH OUTPUT FORCE ACTUATOR FOR AN ACTIVE VIBRATION CONTROL SYSTEM

(75) Inventor: William Arthur Welsh, New Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 50 days.

(21) Appl. No.: 10/062,203

(22) Filed: Jan. 31, 2002

(65) Prior Publication Data

US 2002/0123403 A1 Sep. 5, 2002

Related U.S. Application Data (60) Provisional application No. 60/271,560, filed on Feb. 27, 2001.

(51) Int. Cl.[7] ................................. F16H 7/02
(52) U.S. Cl. ...................... 474/153; 474/148; 474/202; 74/61; 244/17.27
(58) Field of Search ................................ 474/148, 149, 474/150, 151, 152, 153, 202, 237, 238, 273; 244/17.27; 74/61, 87; 416/144, 500

(56) References Cited

U.S. PATENT DOCUMENTS

| | | | |
|---|---|---|---|
| 2,328,475 A | * | 8/1943 | Lockmann et al. ............ 74/567 |
| 3,592,559 A | * | 7/1971 | Ward ........................... 416/121 |
| 4,261,214 A | * | 4/1981 | Watanabe et al. ............ 474/156 |
| 4,324,147 A | * | 4/1982 | Crawford, III ................. 74/37 |
| 4,819,182 A | * | 4/1989 | King et al. .................. 700/280 |
| 5,005,439 A | | 4/1991 | Jensen et al. |
| 5,091,679 A | | 2/1992 | Murty et al. |
| 5,231,336 A | | 7/1993 | van Namen |
| 5,310,137 A | | 5/1994 | Yoerkie, Jr. et al. |
| 5,347,884 A | | 9/1994 | Garnjost et al. |
| 5,392,898 A | * | 2/1995 | Burgess et al. .......... 198/750.8 |
| 5,505,282 A | | 4/1996 | Olgac |
| 5,682,069 A | | 10/1997 | Phillips et al. |
| 5,853,144 A | | 12/1998 | Vincent |
| 5,884,736 A | | 3/1999 | Burdisso et al. |
| 5,906,254 A | | 5/1999 | Schmidt et al. |
| 5,990,583 A | | 11/1999 | Nanba et al. |
| 6,002,778 A | | 12/1999 | Rossetti et al. |
| 6,009,985 A | | 1/2000 | Ivers |
| 6,105,943 A | | 8/2000 | Nagasawa |

OTHER PUBLICATIONS

Jolly, Mark R., Bender, Jonathan W. Bender and Carlson, J. David, Properties and Applications of Commercial Magnetorheological Fluids, Thomas Lord Research Center, Cary, NC.

Chain Drives, Fundamentals of Mechanical Design, pp. 338–340.

* cited by examiner

*Primary Examiner*—David A. Bucci
*Assistant Examiner*—Vicky A. Johnson
(74) *Attorney, Agent, or Firm*—Carlson, Gaskey & Olds (57) ABSTRACT

An active vibration control system provides a mass which is movable through a large excursion while minimizing the system size in two of three dimensions to compensate for sensed vibrations. A first rotating member is rotatable about a first axis and a second rotating member is rotatable about a second axis to drive a belt mounting a mass. The first axis is offset from the second axis such that as the members are rotated, the belt is driven about an elongated path. This arrangement generates an impulsive vibratory force as the mass passes over each of the rotating members and quickly changes direction. A belt including a sinusoidal mass distribution generates a vibratory force that is a smooth sinusoidal output. Multiple systems are suitably usable in conjunction with one another to provide a wide range of vibratory outputs.

38 Claims, 7 Drawing Sheets

HIGH OUTPUT FORCE ACTUATOR FOR AN ACTIVE VIBRATION CONTROL SYSTEM

The present application claims priority to U.S. Provisional Patent Application Ser. No. 60/271,560, filed 27 Feb. 2001.

BACKGROUND OF THE INVENTION

The present invention relates to producing large, controllable, vibratory forces to compensate for sensed noise or vibrations, and more particularly to an active vibration control (AVC) system for an aircraft.

The dominant source of vibration in a helicopter in forward flight is that generated by the main rotor system rotating at the blade passing frequency. Forces and moments are transmitted usually through the transmission via fuselage attachments, to produce vibration in the fuselage.

One conventional approach to reducing such vibration involves replacing a rigid gearbox mounting strut with a compliant strut and parallel hydraulic actuator. A control computer commands the actuators such that the gearbox is selectively vibrated to produce inertial forces which minimize fuselage vibrations. Although effective, this approach is inadequate in a vehicle having a gearbox which is directly attached to the airframe i.e., without struts.

Another conventional approach utilizes counter-rotating eccentric masses that rotate at the frequency of the primary aircraft vibration and generate a fixed magnitude vibration force. A second pair of eccentric masses is phased relative to the first pair to yield any force magnitude from zero to maximum force. This system, although effective for direct gearbox mounting, requires a parasitic mass of considerable magnitude which results in an unacceptable weight penalty. Moreover, this approach does not provide an acceptable reduction in size as the diameter of the circular shaped device is difficult to fit in the confined spaces available in an aircraft.

Accordingly, it is desirable to provide an active vibration control system which generates relatively large controllable vibratory forces with a lower weight and smaller size than conventional systems.

SUMMARY OF THE INVENTION

The active vibration control (AVC) system according to the present invention provides a mass which is movable through a large excursion while minimizing the system size in two of three dimensions to compensate for sensed vibrations.

An AVC system according to the present invention includes a first rotating member such as a first pulley which is rotatable about a first axis and a second rotating member such as a second pulley which is rotatable about a second axis. The first axis is offset from the second axis such that as the pulleys are rotated, a belt having a discrete mass attached thereto is driven about an elongated path defined by the pulleys. This arrangement generates an impulsive vibratory force as the mass passes over each of the pulleys and quickly changes direction.

In another AVC system, a belt includes a sinusoidal mass distribution. This arrangement generates a vibratory force that is a smooth sinusoidal output.

In another AVC system, a fixed track guides one or more movable mass units about a path defined by a first and second radius. The first radius is defined about a first axis and a second radius is defined about a second axis to form an elongated path. The mass units are movable along the track and relative to each other. Movement of the mass units along the single track generate a desired force output magnitude and phase.

Adjustable masses such as magneto-rheological fluids may additionally or alternatively be provided to adjust the vibratory output in real time. Moreover, the various AVC systems are suitably usable in conjunction with one another to provide a wide range of force output magnitudes and phases.

The present invention therefore provides an active vibration control system which generates relatively large controllable vibratory forces while providing weight and size advantages particularly applicable to aircraft.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
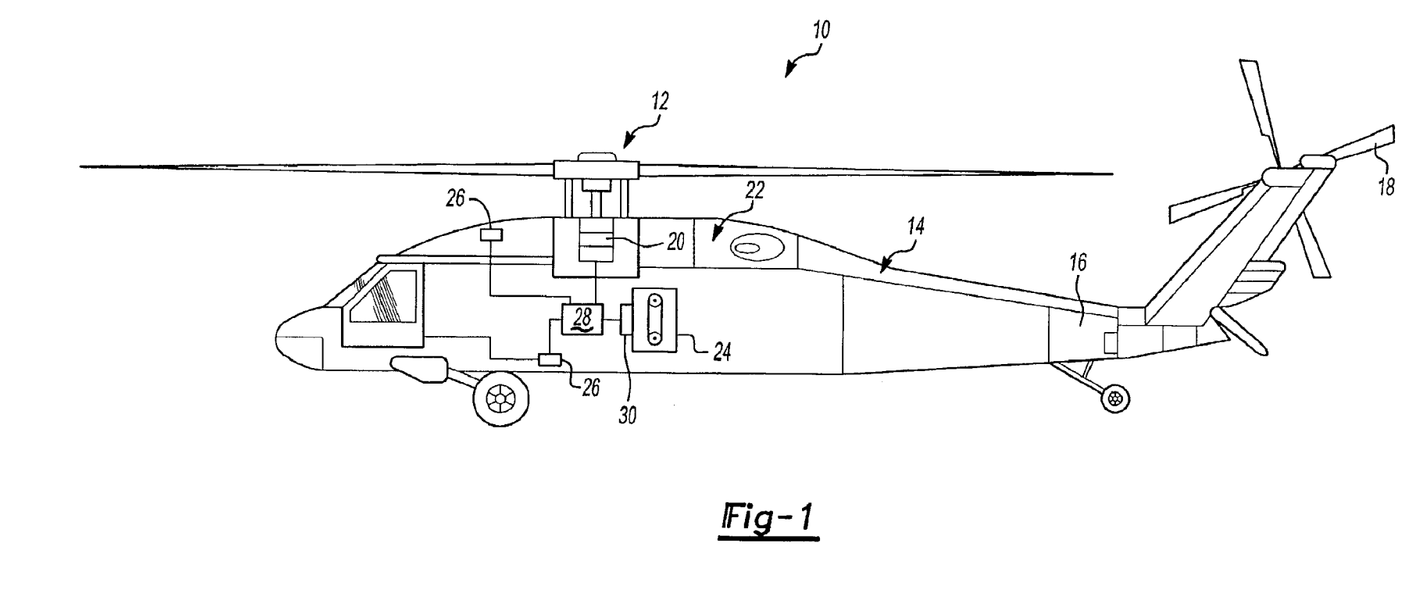
FIG. 1 is a general perspective view an exemplary rotary wing aircraft embodiment for use with the present invention.

FIG. 1 schematically illustrates an aircraft 10 having a main rotor assembly 12. The aircraft 10 includes a fuselage 14 having an extending tail 16 which mounts an anti-torque rotor 18. Although a particular helicopter configuration is illustrated in the disclosed embodiment, other machines will also benefit from the present invention. The main rotor assembly 12 is driven through a transmission (illustrated schematically at 20) by one or more engines 22. Vibrations from the rotating main rotor assembly 12, transmission 20, and the engines 22 are thus transmitted to the helicopter fuselage 14. This vibration transmission is particularly manifest in rigid gearbox mounted systems.

An active vibration control (AVC) system 24 is mounted within the fuselage 14 and preferably within a fuselage sidewall. For example, there are several places in an aircraft sidewall that have relatively large heights (waterline) but relatively narrow widths (buttline) and lengths (station) which are particularly appropriate for locating the AVC system 24.

A plurality of sensors 26 are mounted at various locations and communicate with a processor 28. The sensors 26 are preferably mounted in the cockpit or cabin areas adjacent crew or passenger stations. The sensors 26 are preferably accelerometers which generate signals representative of dynamic changes at selected locations as the main rotor assembly 12 rotates. The processor 28 generates output signals to drive a power source 30 which controls the phase and magnitude characteristics of the AVC system 24.

In operation, vibratory forces are produced by the main rotor assembly 12 due, for example, to asymmetric air flow in forward flight. Such vibratory forces arising as the main rotor assembly 12 rotates are, in the absence of any compensating systems, transmitted from the rotor 12 to the fuselage 14. Operation of the AVC system 24 is continuously varied by the processor 28 to cater to changing dynamic characteristics such that vibratory forces are reduced or eliminated.

Figure 2A:
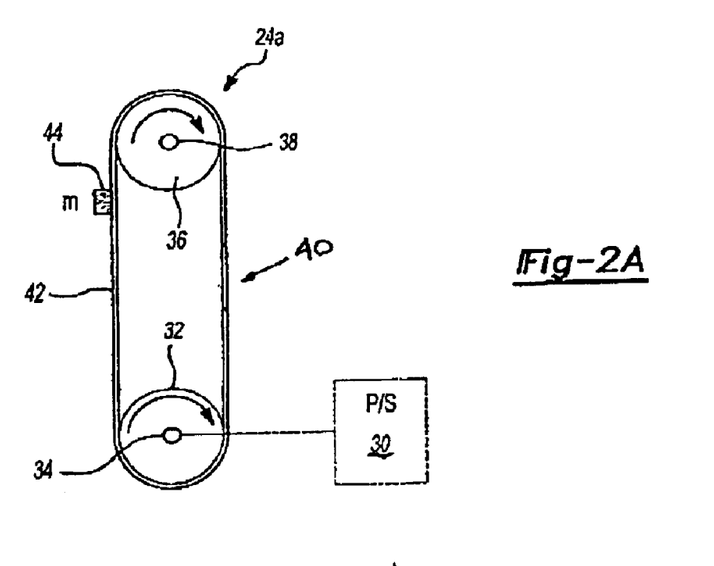
FIG. 2A is a general perspective view of an active vibration control system according to the present invention.

Referring to FIG. 2A, an AVC system 24a is illustrated. A first rotating member such as a first pulley 32 is rotatable about a first axis 34. A second rotating member such as a second pulley 36 is rotatable about a second axis 38. Preferably the power source 30 (also illustrated in FIG. 1) includes an AC or DC power supply or other vehicle power source with sufficient output to rotate pulleys 32,36 in a desired manner as directed by the processor 28 (FIG. 1).

The first axis 34 is offset from the second axis 38 such that an elongated path 40 is formed about the pulleys 32,36. Preferably, a belt 42 or the like is driven by the pulleys 32 and 36. The belt 42 is rotated when the pulleys 32,36 rotate. It should be understood that other elongated members such as chains, hoses, and the like that move the mass along a path will benefit from the present invention. It will be further understood that a fixed track having movable mass members will also benefit from the present invention.

Figure 2B:
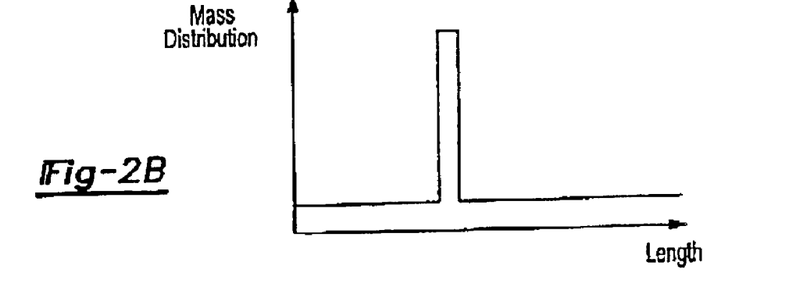
FIG. 2B is a graphical representation of a mass distribution for the active vibration control system of FIG. 2A.
Figure 2C:
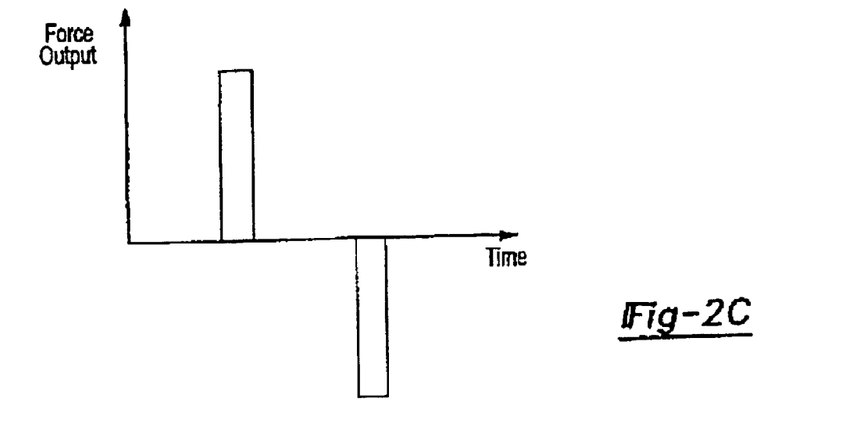
FIG. 2C is a graphical representation of a force output for the active vibration control system of FIG. 2A.

A discrete mass 44 is mounted to the otherwise uniform belt 42. The mass distribution is represented by a step function (FIG. 2B). As the pulleys are rotated, the mass 44 travels with the belt 42 along the elongated path 40. Applying torque to one of the pulleys 32,36 propels the belt 42. This arrangement generates a vibratory force that is impulsive (FIG. 2C). This impulsive force results when the single concentrated mass 44 passes over each of the pulleys 32,36 thereby quickly changing direction. During the time the mass 44 traverses between pulleys 32,36 the mass 44 is moving with a substantially constant velocity and does not produce a force. It should be understood that by adjusting the radius of the pulleys, the length of the path and the velocity, various forces and phases are achieved.

Figures 2D, 3A, 3B:
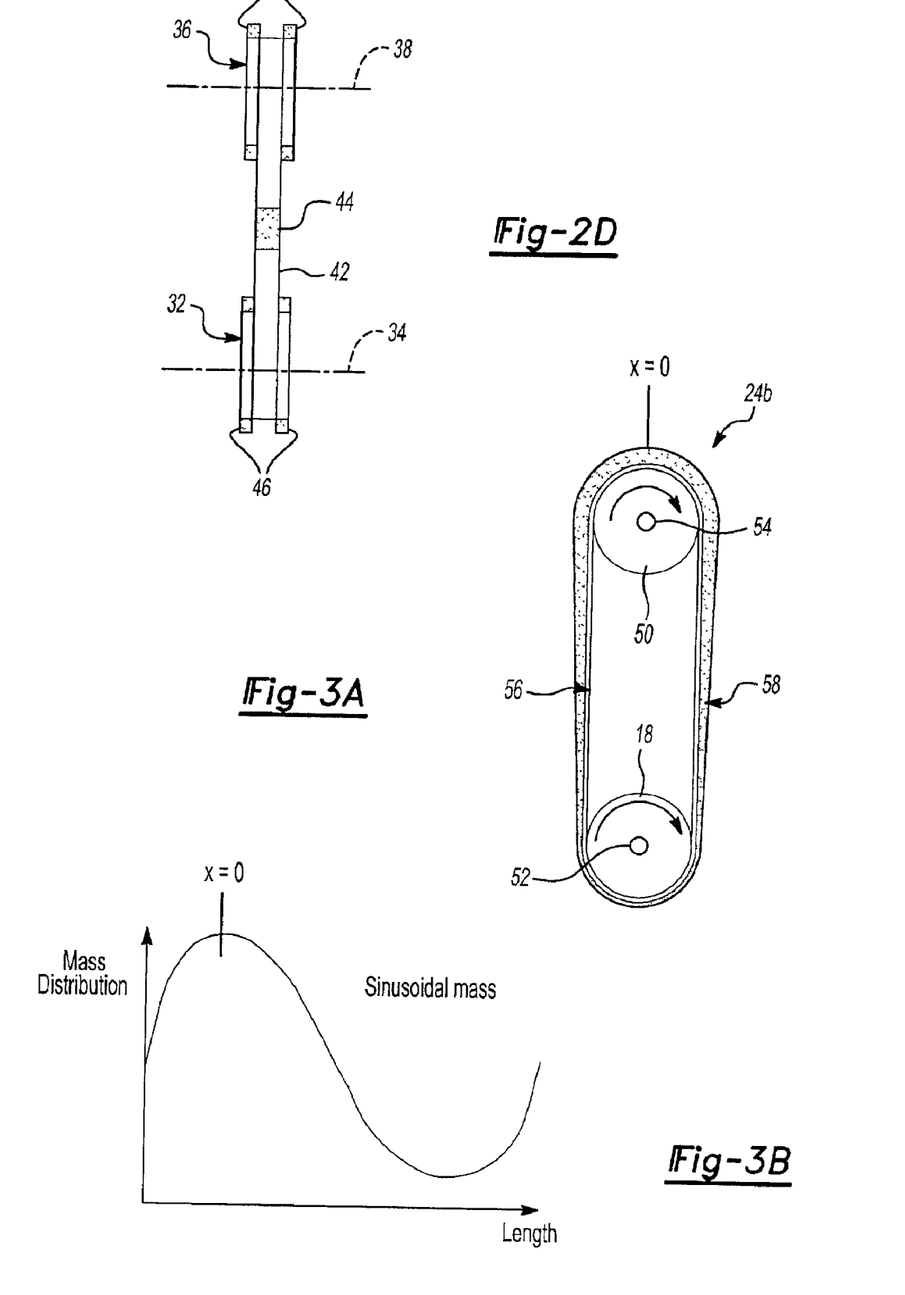
FIG. 2D is a side view of an active vibration control system of FIG. 2A.
FIG. 3A is a general perspective view of an active vibration control system according to the present invention.
FIG. 3B is a graphical representation of a mass distribution for the active vibration control system of FIG. 3A.

A radial guide 46 extends from the pulleys 32,36. Preferably, the guide 46 is a radial extending flange on each side of the pulleys 32,36 (FIG. 2D). The guide 46 supports the belt 42 to reduce undesired lateral motion.

Referring to FIG. 3A, another AVC system 24b is illustrated. The FIG. 3A system 24b is similar to the FIG. 2A system but produces a sinusoidal output. Pulleys 48,50 rotate about a respective first axis 52 and second axis 54 drive a belt 56 along an elongated path 58. The belt 56 is rotated when the pulleys 48,50 rotate as described above. The belt 56 includes a sinusoidal mass distribution (FIG. 3B). The sinusoidal mass distribution is preferably provided by weighting the belt along its length or may additionally or alternatively include a plurality of discrete masses attached to the belt to provide the desired mass distribution (FIG. 3B).

Figure 3C:
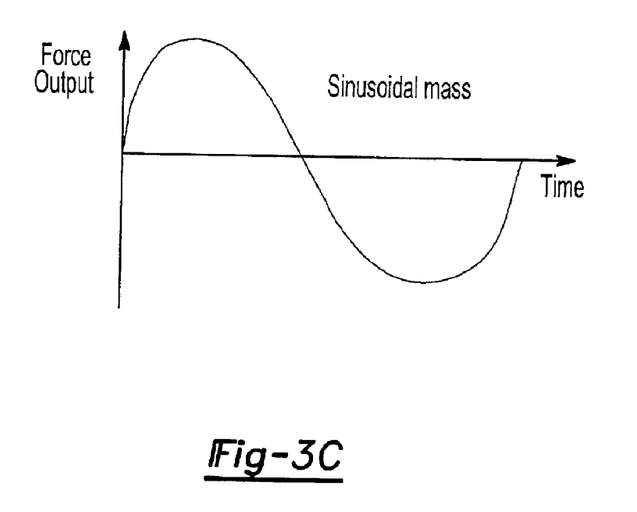
FIG. 3C is a graphical representation of a force output for the active vibration control system of FIG. 3A.

Applying torque to one of the pulleys 48,50 propels the belt 56. This arrangement generates a vibratory force that is a smooth sinusoidal output (FIG. 3C). Another way to understand the dynamics is to visualize the center of gravity of the belt moving up and down as the belt progresses around the pulleys 48,50. Such a smooth sinusoidal vibratory force output is particularly suitable for the compensation of main rotor rotation vibrations.

Figure 4:
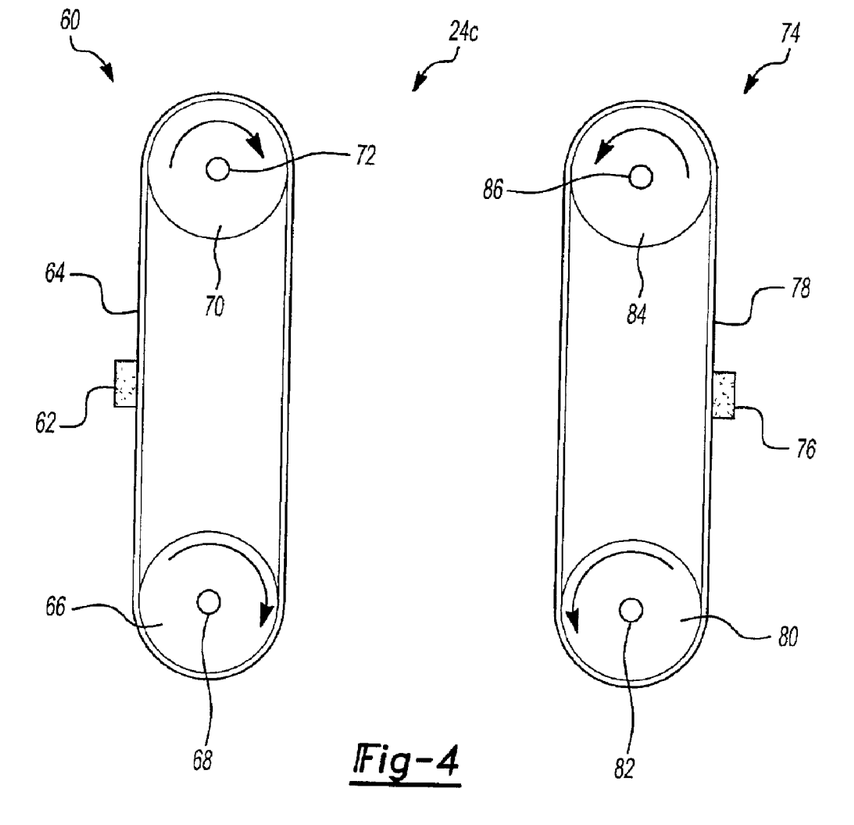
FIG. 4 is a general perspective view of another active vibration control system according to the present invention.
Figure 4A:
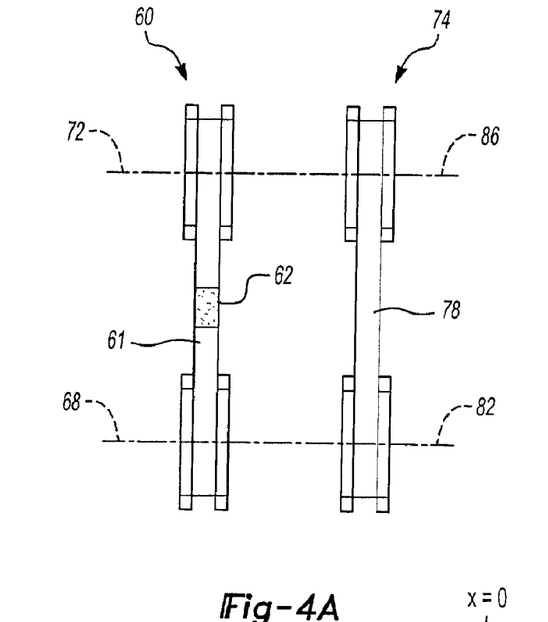

Referring to FIG. 4, another AVC system 24c is illustrated. As illustrated in FIG. 4, two of the FIG. 2A systems can be phased relative to each other to produce a variable unidirectional force amplitude and phase. A first system 60 provides a discrete mass 62 affixed to a belt 64. A first pulley 66 is rotatable about a first axis 68 and a second pulley 70 is rotatable about a second axis 72. A second system 74 provides a second discrete mass 76 affixed to a second belt 78. A third pulley 80 is rotatable about a third axis 82 and a fourth pulley 84 is rotatable about a fourth axis 86. It should be understood that the first axis 68 and third axis 82 and the second axis 72 and fourth axis 86 maybe coaxial. That is, the first system 60 and second system 74 operate about common axes (FIG. 4A). Preferably, the systems 60,74 rotate in opposite directions to cancel small off-axis forces.

Figure 5:
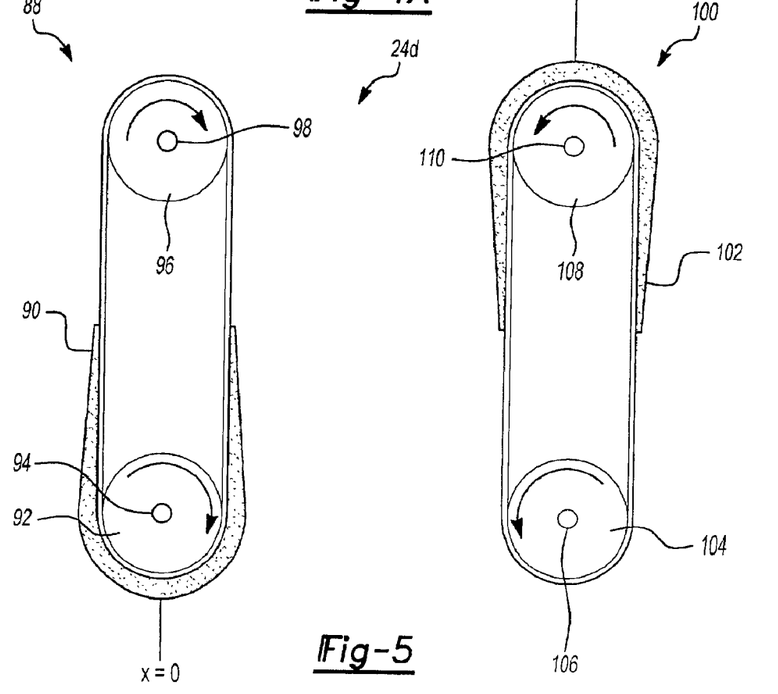
FIG. 5 is a general perspective view of another active vibration control system according to the present invention.

Referring to FIG. 5, another AVC system 24d is illustrated. As illustrated in FIG. 5, two of the FIG. 3A system can be phased relative to each other to produce a variable unidirectional sinusoidal force amplitude and phase. A first system 88 provides a belt 90 having a sinusoidal mass distribution. A first pulley 92 is rotatable about a first axis 94 and a second pulley 96 is rotatable about a second axis 98. A second system 100 provides a second belt 102 having a sinusoidal mass distribution. A third pulley 104 is rotatable about a third axis 106 and a fourth pulley 108 is rotatable about a fourth axis 110. It should be understood that the first axis 94 and third axis 106 and the second axis 98 and fourth axis 110 maybe coaxial. That is, the first system 88 and second system 100 operate about common axes. Preferably, the systems 88,100 rotate in opposite directions to cancel small off-axis forces.

Figure 6A:
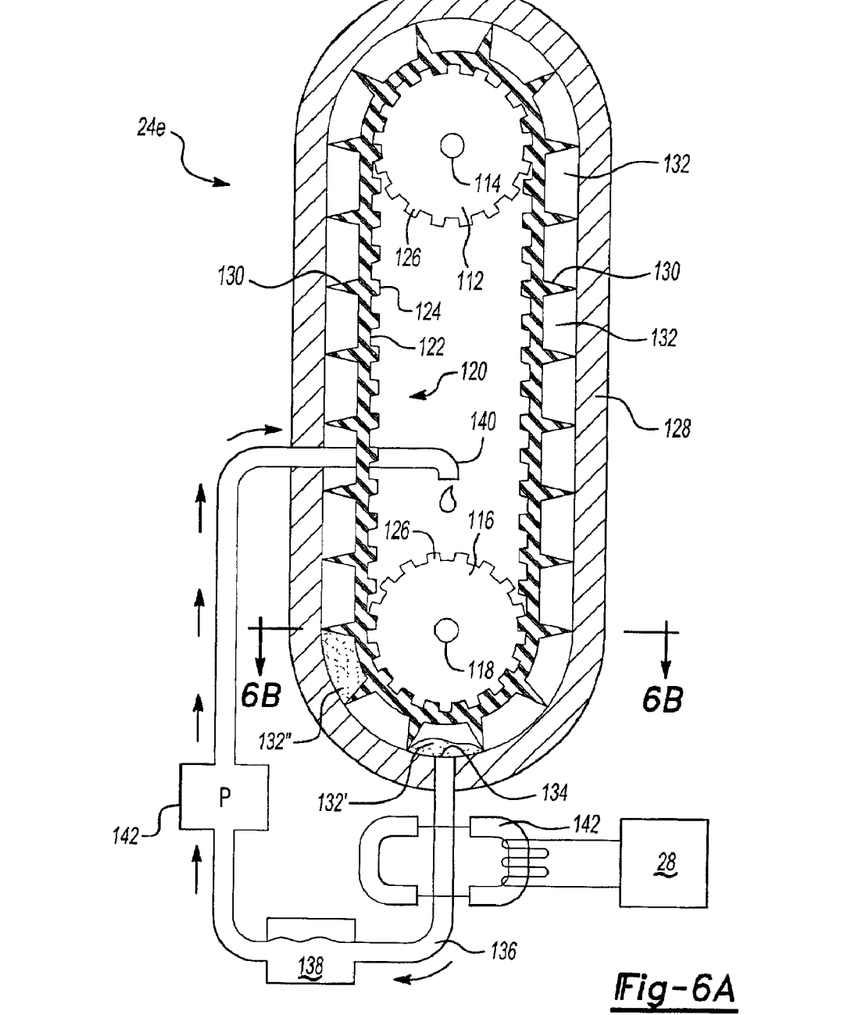
FIG. 6A is a general perspective view of another active vibration control system according to the present invention.

Referring to FIG. 6A, another AVC system 24e is illustrated. A first rotating member such as a first pulley 112 is rotatable about a first axis 114. A second rotating member such as a second pulley 116 is rotatable about a second axis 118. The first axis 114 is offset from the second axis 118 such that an elongated path 120 is formed about the pulleys 112, 116.

A belt 122 or the like is driven by the pulleys 112,116 along the elongated path 120. Preferably, corresponding belt teeth 124 along the inner surface of the belt 122 engage pulley teeth 126 on the outer diameter of the pulleys 112, 116 to prevent slipping therebetween.

Figure 6B:
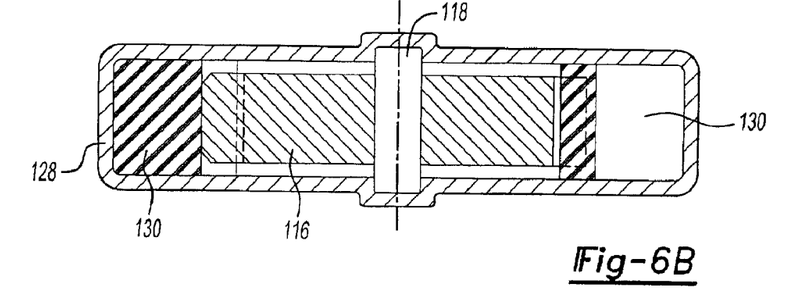
FIG. 6B is a sectional view taken along the line 6B-6B of FIG. 6A.

The belt 122 is rotated within a housing 128. The belt 122 includes a plurality of fins 130 extending about the outer surface of the belt 122 and in engagement with the housing 128 to form a multiple of cavities 132. The fins 130 preferably extend past the width of the pulleys 112, 116 (FIG. 6B) in sealing relationship with the housing 128.

An output 134 in the housing 128 communicates with a magneto-rheological fluid return passage 136 and a magneto-rheological fluid source 138. Preferably, the output 134 is located in a low portion of the housing 128. The magneto-rheological fluid passage 136 communicates with an input 140 to the housing 128. The input 140 is located in a higher portion of the housing 128. A pump 142 or the like transfers fluid from the source 138 through the input 140 and into the housing 128.

The magneto-rheological fluid preferably includes a relatively high iron content. An electromagnetic valve 142 adjacent the output 124 operates to seal the housing 128 such that a cavity 132' adjacent the output 134 may be filled with fluid. That is, the actuated electromagnetic valve 142 solidified the fluid in the passage 136 and seals the output 134. Fluid is trapped in a lower portion of the housing 128 as the fins 130 pass thereby. Under normal conditions, the magneto-rheological fluid is a free-flowing liquid. Actuation of the electromagnetic valve 142 selectively transforms the fluid into a near-solid in milliseconds such that the fluid in the lower portion of the housing 128 will not drain through the output 124. Just as quickly, the fluid can be returned to its liquid state with the removal of the field.

A fluid filled cavity 132" formed between the fins 130 and housing 128 is thereby formed which selectively creates a mass distribution which weights the belt 122 along its length and creates a vibratory force as the filled cavity 132" passes each pulley 114, 116 as described above. One or more filled cavities 132" may thereby be formed to alter the weight distribution along the belt 122 and the controlled force output of the AVC system 24e. Centrifugal force entraps the fluid between opposed fins 130 and the housing 128 during rotation of the belt 122. Once filled, control of vibratory forces may be further controlled by varying the speed of the pulleys 114, 116 as described above. Operation of the AVC system 24e is then controlled as described above to cater to changing dynamic characteristics such that vibratory forces are reduced or eliminated. It should be understood that the cavities 132 may also be partially filled to further vary the compensation for vibratory forces. Essentially any vibratory force output may thereby be provided by the controlled filling of a desired number and portion of one or more cavities.

When the electromagnetic valve 142 is deactivated, the magneto-rhealogical fluid is returned to its liquid state and flows through the output. The fluid from the filled cavity 132" drains into the source 138 such that the weight distribution of belt 122 is returned to equilibrium (no filled cavities) and no vibratory force is generated. The processor 28 preferably controls the phase and magnitude characteristics of the AVC system 24e by filling one or more cavities.

Figure 7:
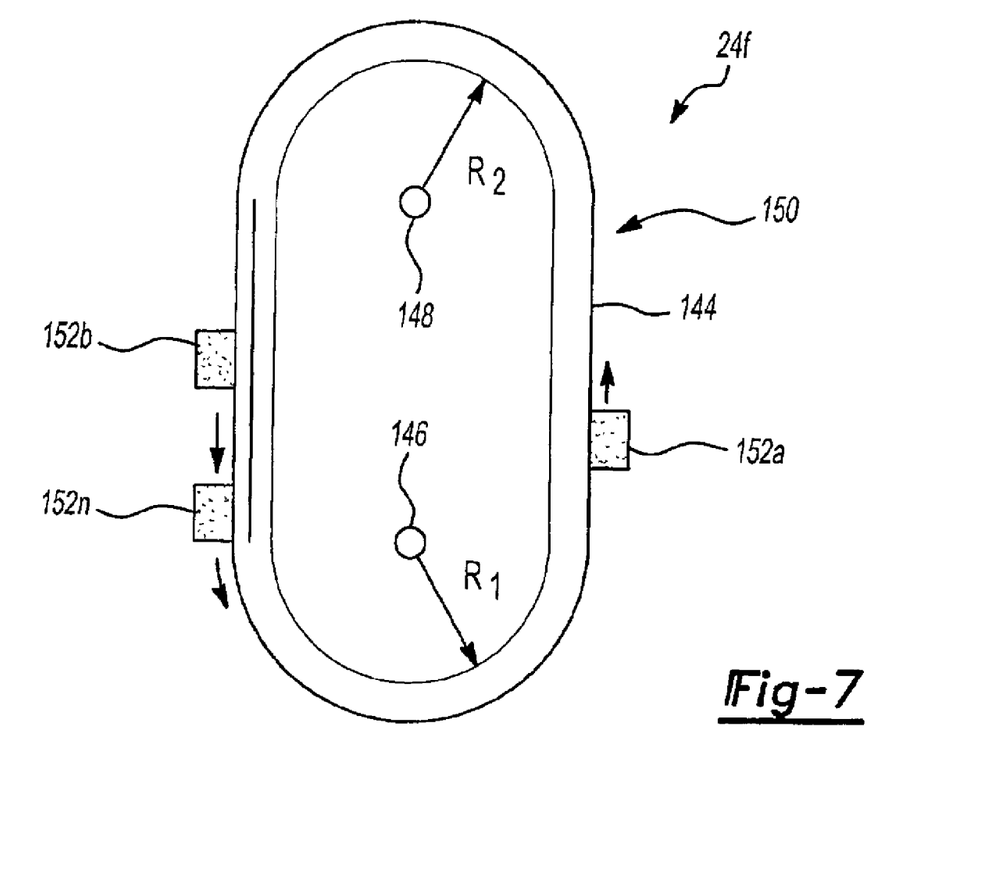
FIG. 7 is a general perspective view of another active vibration control system according to the present invention.

Referring to FIG. 7, another AVC system 24f is illustrated. A track 144 is defined about a first radius R1 about a first axis 146 and a second radius R2 defined about a second axis 148 to form an elongated path 150. The first axis 146 is offset from the second axis 148 such that one or more independent masses 152(a) . . . (n) (where n is any desired number) are independently movable along the track 144. That is, the track 144 remains stationary and the masses 152 move relative to the track 144. Adjustable masses 152(a) . . . (n) are preferably electromagnetically movable along the track 144 and relative to each in a manner as described above. It should be understood that other drive mechanisms will benefit according to the present invention. By moving the masses 152 relative to each other, the vibratory forces are controlled to cancel each other out, or provide a desired vibratory force.

The AVC systems described herein are suitably used in conjunction with one another. For example only, the discrete mass system may be used in conjunction with one or more of the sinusoidal mass systems, adjustable mass systems, or the passageway system depending on the application. Furthermore, the present invention is not limited to a microprocessor based control system. The system may be implemented in a non-microprocessor based electronic system (either digital or analog).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An active vibration control system comprising:
   a path formed about a first axis and a second axis, said second axis offset a fixed distance from said first axis:
   a mass movable around said path to produce a vibratory force;
   a power source to drive mass about said path; and
   a processor which generates an output signal to drive said power source to control phase and magnitude characteristics of said vibratory force.

2. The active vibration control system as recited in claim 1, wherein said path includes a passageway.

3. The active vibration control system as recited in claim 1, wherein said mass includes a magneto-rheological fluid movable along said path.

4. The active vibration control system as recited in claim 1, wherein said path includes a belt mounting said mass.

5. The active vibration control system as recited in claim 4, wherein said mass includes a plurality of discrete mass members mounted along said belt, each of said plurality of discrete mass members located at a predetermined position along said belt.

6. The active vibration control system us recited in claim 1, wherein said path includes a belt having a sinusoidal mass distribution.

7. The active vibration control system as recited in claim 1, further comprising:
   a second path formed about a third axis and a fourth axis, said fourth axis offset from said third axis; and
   a second mass movable along said second path to produce a vibratory force.

8. The active vibration control system as recited in claim 7, wherein said mass is movable in a first direction and said second mass is movable in a second direction.

9. The active vibration control system as recited in claim 7, wherein said second mass includes a sinusoidal mass distribution.

10. The active vibration control system as recited in claim 1, wherein said processor correlates the vibratory force to a sensed vibratory change of a main rotor assembly.

11. The active vibration control system as recited in claim 1, wherein said path is defined within a helicopter fuselage sidewall.

12. An active vibration control system comprising:
    a first pulley rotatable about a first axis;
    a second pulley rotatable about a second axis, said second axis offset a fixed distance from said first axis;
    a belt defining a mass, said belt drivable about said first pulley and said second pulley to produce a vibratory force;

a power source to said mass about said path; and a processor which generated an output signal to drive said power source to control phase and magnitude characteristics of said vibratory force.

13. The active vibration control system as recited in claim 12, wherein said mass includes a discrete mass mounted to said belt.

14. The active vibration control system as recited in claim 12 wherein said mass includes a plurality of discrete mass members mounted to said belt, each of said plurality of discrete mass members located at predetermined position along a length of said belt.

15. The active vibration control system as recited in claim 12, wherein said mass includes a sinusoidal mass distribution along a length of said belt.

16. The active vibration control system as recited in claim 12, further comprising a first guide radially extending from said first pulley and a second guide radially extending from said second pulley to minimize lateral motion of said belt.

17. The active vibration control system as recited in claim 12, further comprising:

a third pulley rotatable about a third axis;

a fourth pulley rotatable about a fourth axis, said second fourth axis offset from said third axis; and a second belt defining a second mass, said second belt drivable about said third pulley and said fourth pulley, said belt and said second belt phased relative to each other to produce a variable force amplitude and phase.

18. The active vibration control system as recited in claim 17, wherein said belt rotates in a first direction and said second belt rotates in a second direction.

19. The active vibration control system as recited in claim 17, wherein said second mass includes a sinusoidal mass distribution along a length of said second belt.

20. The active vibration control system as recited in claim 12, wherein an interface between said belt and said first pulley and said second pulley is generally flat.

21. The active vibration control system as recited in claim 12, wherein said processor correlates the vibratory force to a sensed vibratory change of a main rotor assembly.

22. The active vibration control system as recited in claim 12, wherein said path is defined within a helicopter fuselage sidewall.

23. A method of active vibration control comprising the steps of:

(1) defining a path about a first axis and a second axis, said second axis offset a fixed distance from said first axis; and (2) controlling movement of a mass about said path to produce a vibratory force within a helicopter fuselage sidewall; and (3) correlating the vibratory force said step (2) with a sensed vibratory change of a main motor assembly.

24. A method as recited in claim 23, wherein said step (2) further comprises controlling movement of a discrete mass about said path.

25. A method as recited in claim 23, further comprising the step of:

(4) transmitting the vibratory force of said step (2) to the helicopter fuselage sidewall to minimize the sensed vibratory change of the main rotor assembly.

26. A method as recited in claim 23, wherein said step (2) further comprises filling one or mare cavities defined along said path with a fluid to produce the vibratory force.

27. A method as recited in claim 23, further comprising the steps of:

(3) defining a second path about a third axis and a fourth axis, said fourth axis offset from said third axis; and (4) controlling movement of a second mass about said second path to produce a vibratory force.

28. A method as recited in claim 27, wherein said step (4) further comprises controlling movement of said second mass relative to said first mass.

29. An active vibration control system comprising:

a first pulley rotatable about a first axis;

a second pulley rotatable about a second axis, said second axis offset from said first axis;

a housing defined about said first pulley and said second pulley;

a belt drivable about said first pulley and said second pulley, said belt define a plurality of cavities within said housing; and a fluid in communication with said housing, said fluid operable to fill one or more of said cavities to produce a vibratory force.

30. The active vibration control system as recited in claim 29, wherein said fluid includes a magneto-rheological fluid.

31. The active vibration control system as recited in claim 30, further comprising an electromagnet valve to control communication of said fluid within said housing.

32. The active vibration control system as recited in claim 29, wherein said belt comprises a plurality of fins in a sealing relationship with said housing to define said plurality of cavities.

33. The active vibration control system as recited in claim 32, further comprising a plurality of teeth extending from an outer diameter of said first and second pulleys, said plurality of teeth extending from said outer diameter of said first and second pulleys engageable with a plurality of belt teeth extending from an inner surface of said belt.

34. An active vibration control system comprising:

a path formed about a first axis and a second axis, said second axis offset from said first axis;

a second path formed about a third axis and a fourth axis, said fourth axis offset from said third axis;

a mass movable along said path;

a second mass movable along said second path;

said mass movable relative to and said second mass to produce a resultant vibratory force.

35. A active vibration control system comprising:

a first pulley rotable about a first axis;

a second pulley rotatable about a second axis, said second axis offset from said first axis;

a belt defining a mass, said belt drivable about said first pulley and said second pulley to produce a vibratory force;

a third pulley rotatable about a third axis;

a fourth pulley rotatable about a fourth axis, said second fourth axis offset from said third axis; and a second belt defining a second mass, said second belt drivable about said third pulley and said fourth pulley, said belt and said second belt phased relative to each other to produce a variable force amplitude and phase;

wherein said belt rotates in a first direction and said second bell rotates in a second direction.

36. A method of active vibration control comprising the steps of:

(1) defining a path about a first axis and a second axis, said second axis offset from said first axis; and (2) controlling movement of a mass about said path through filling one or more cavities defined along said path with a fluid to produce the vibratory force.

37. A method of active vibration control comprising the steps of:
   (1) defining a path about a first axis and a second axis, said second axis offset from said first axis;
   (2) controlling movement of a mass about said path to produce a vibratory force
   (3) defining a second path about a third axis and a fourth axis, said fourth axis offset from said third axis;
   (4) controlling movement of a second mass about said second path to produce a vibratory force; and
   (5) controlling movement of said second mass relative to said first mass.

38. An active vibration control system comprising:
   a path formed about a first axis and a second axis, said second axis offset a fixed distance from said first axis; and
   a mass movable along said path to produce a vibratory force, said mass includes a magneto-rheological fluid movable along said path.

* * * * *

UNITED STATES PATENT AND TRADEMARK OFFICE
CERTIFICATE OF CORRECTION

PATENT NO. : 6,869,375 B2
DATED : March 22, 2005
INVENTOR(S) : Welsh

It is certified that error appears in the above-identified patent and that said Letters Patent is hereby corrected as shown below:

Column 6,
Line 40, "us" should be -- as --.

Column 7,
Line 1, insert -- drive -- after "to" and before the first occurrence of "said".
Line 2, "generated" should be -- generates --.
Line 64, "mare" should be -- more --.

Column 8,
Line 60, "bell" should be -- belt --.

Signed and Sealed this

Fifth Day of July, 2005

JON W. DUDAS
*Director of the United States Patent and Trademark Office*